(12) United States Patent
Imagawa et al.

(10) Patent No.: US 10,905,992 B2
(45) Date of Patent: Feb. 2, 2021

(54) HONEYCOMB STRUCTURAL BODY, METHOD FOR MANUFACTURING THE SAME, AND EXHAUST GAS PURIFICATION FILTER

(71) Applicant: DENSO CORPORATION, Kariya (JP)

(72) Inventors: Hirokatsu Imagawa, Kariya (JP); Hironori Niwa, Kariya (JP)

(73) Assignee: DENSO CORPORATION, Kariya (JP)

( * ) Notice: Subject to any disclaimer, the term of this patent is extended or adjusted under 35 U.S.C. 154(b) by 146 days.

(21) Appl. No.: 16/337,520

(22) PCT Filed: Sep. 26, 2017

(86) PCT No.: PCT/JP2017/034758
§ 371 (c)(1),
(2) Date: Mar. 28, 2019

(87) PCT Pub. No.: WO2018/062186
PCT Pub. Date: Apr. 5, 2018

(65) Prior Publication Data
US 2019/0224606 A1 Jul. 25, 2019

(30) Foreign Application Priority Data

Sep. 30, 2016 (JP) .................................. 2016-192453

(51) Int. Cl.
*B01D 46/24* (2006.01)
*B01D 46/00* (2006.01)
(Continued)

(52) U.S. Cl.
CPC ......... *B01D 46/2459* (2013.01); *B01D 39/20* (2013.01); *B01D 46/00* (2013.01);
(Continued)

(58) Field of Classification Search
CPC ............ B01D 46/2429; B01D 46/2459; B01D 46/0001; B01D 53/94; B28B 3/269; B01J 35/04; F01N 3/2803
(Continued)

(56) References Cited

U.S. PATENT DOCUMENTS 5,514,446 A * 5/1996 Machida ............... F01N 3/2828
428/116
2009/0239031 A1 * 9/2009 Ichikawa ............ C04B 38/0009
428/116
(Continued)

FOREIGN PATENT DOCUMENTS

JP          2015-175359         10/2015

*Primary Examiner* — Tom P Duong
(74) *Attorney, Agent, or Firm* — Nixon & Vanderhye P.C.

(57) ABSTRACT

A honeycomb structural body includes: a porous cell wall that partitions a cylindrical casing; and a large number of cells extending in the axial direction X thereof and alternately blocked at an upstream end face. The large number of cells include plugged cells having plugs and penetrating cells that do not have the plugs. The plugged cells and the penetrating cells both include complete cells and incomplete cells. At least some of plugged incomplete cells of the incomplete cells have a cross-sectional area smaller than a cross-sectional area of penetrating complete cells, and are configured as blocked cells that are entirely blocked inside in the axial direction.

9 Claims, 11 Drawing Sheets

(51) Int. Cl.
  *B01D 53/94* (2006.01)
  *B28B 3/26* (2006.01)
  *B01J 35/04* (2006.01)
  *F01N 3/28* (2006.01)
  *B01D 39/20* (2006.01)
  *F01N 3/022* (2006.01)
  *B28B 11/24* (2006.01)
  *B28B 3/20* (2006.01)

(52) U.S. Cl.
  CPC ....... *B01D 46/0001* (2013.01); *B01D 46/247* (2013.01); *B01D 53/94* (2013.01); *B01J 35/04* (2013.01); *B28B 3/26* (2013.01); *B28B 3/269* (2013.01); *F01N 3/022* (2013.01); *F01N 3/2803* (2013.01); *B01D 53/945* (2013.01); *B01D 2046/2481* (2013.01); *B01D 2046/2485* (2013.01); *B01D 2255/9155* (2013.01); *B01D 2279/30* (2013.01); *B28B 11/243* (2013.01); *B28B 2003/203* (2013.01)

(58) Field of Classification Search
  USPC .......................................................... 55/523
  See application file for complete search history.

(56) References Cited

U.S. PATENT DOCUMENTS

| | | | |
|---|---|---|---|
| 2009/0239032 A1* | 9/2009 | Ichikawa | B01D 46/247 428/117 |
| 2011/0236624 A1* | 9/2011 | Saito | B01D 46/2474 428/116 |
| 2011/0237427 A1* | 9/2011 | Saito | B01D 46/2455 502/100 |
| 2014/0272279 A1* | 9/2014 | Aoyama | C04B 38/0009 428/118 |
| 2015/0240678 A1* | 8/2015 | Aoyama | B32B 3/12 428/117 |

* cited by examiner

HONEYCOMB STRUCTURAL BODY, METHOD FOR MANUFACTURING THE SAME, AND EXHAUST GAS PURIFICATION FILTER

CROSS-REFERENCE TO RELATED APPLICATION

This application is the U.S. national phase of International Application No. PCT/JP2017/034758 filed Sep. 26, 2017, which designated the U.S. and claims priority to Japanese Patent Application No. 2016-192453 filed on Sep. 30, 2016, the entire contents of each of which are incorporated herein by reference.

TECHNICAL FIELD

The present disclosure relates to a honeycomb structural body having a one-side plug structure, a method for manufacturing the same, and an exhaust gas purification filter including a honeycomb structural body.

BACKGROUND ART

An exhaust pipe for an internal combustion engine such as an automobile engine is provided with an exhaust gas purification filter that collects particulate matter (hereinafter also referred to as PM) contained in exhaust gas. The exhaust gas purification filter includes a honeycomb structural body having a porous cell wall and a large number of cells surrounded and formed by the cell wall. A typical honeycomb structural body includes exhaust gas paths inside its cells and has a double-side plug filter structure. Specifically, a large number of parallel cells are alternately sealed at the end face located upstream or downstream relative to the flow of exhaust gas. Exhaust gas flows into cells with upstream openings, undergoes the removal of particulate matter while passing through the cell wall, and is discharged from cells with downstream openings.

Honeycomb structural bodies having a one-side plug filter structure, i.e., cells sealed only on the upstream side, have also been proposed. For example, PTL 1 has disclosed a honeycomb structural body having a porous wall defining a plurality of cells. Specifically, some of the cells are substantially blocked at the inlet face for exhaust gas, and the other cells extend from the inlet face through the outlet face. Exhaust gas contains a tiny amount of ash derived from impurities (e.g., S and Ca) in engine oil or fuel. Deposition of ash in the honeycomb structural body increases pressure loss and reduces the efficiency of PM collection. In this regard, a one-side plug filter structure is advantageous in discharging ash through the open cells to prevent deposition of ash.

CITATION LIST

Patent Literature

[PTL 1] JP 2015-175359 A

SUMMARY OF THE INVENTION

In an exhaust gas purification filter with a one-side plug structure, exhaust gas becomes less able to pass through the cell wall as it flows farther downstream since the difference in pressure between adjacent cells decreases. Therefore, the structure of PTL 1 includes penetrating cells and sealed cells with different hydraulic diameters so as to increase the difference in pressure. In actuality, however, PM is not necessarily collected efficiently by the cell wall except near the exhaust gas inlet where the difference in pressure is large.

An object of the present disclosure is to provide a honeycomb structural body that allows gas to pass through the cell wall defining adjacent cells even on the downstream side relative to the flow of gas and can achieve an improvement in the performance of collection of particulate matter from gas streams, a method for manufacturing the same, and an exhaust gas purification filter including the same.

An aspect of the present disclosure is a honeycomb structural body including:
- a porous cell wall that partitions a cylindrical casing that is open at both ends;
- a large number of cells surrounded by the cell wall to form gas flow paths extending in an axial direction of the cylindrical casing; and
- plugs that alternately block the large number of cells at an upstream end face of the gas flow paths, wherein
- the large number of cells include plugged cells having the plugs and penetrating cells that do not have the plugs,
- the plugged cells and the penetrating cells both include complete cells totally surrounded by the cell wall and incomplete cells surrounded by the cylindrical casing and the cell wall and having an incomplete cross-sectional shape,
- at least some of plugged incomplete cells of the incomplete cells have a cross-sectional area A1 smaller than a cross-sectional area B of penetrating complete cells, and are configured as blocked cells that are entirely blocked inside in the axial direction, the plugged incomplete cells being some of the plugged cells, the penetrating complete cells being some of the penetrating cells and having a complete cell shape, and
- on a downstream side of the gas flow paths, a rate of gas flow through the cell wall from the penetrating complete cells adjacent to the blocked cells is higher than that from the penetrating complete cells that are not adjacent to the blocked cells.

Another aspect of the present disclosure is a method for manufacturing the honeycomb structural body, the method including:
- a molding step of using an extrusion die including an extrusion groove portion having a shape corresponding to the cell wall and the cylindrical casing, and supplying a molding material for the honeycomb structural body to the extrusion groove portion to extrude the molding material into a honeycomb structure;
- a plugging step of filling, to form the plugged cells, some of the cells with a formation material for the plugs on one end face side of an obtained honeycomb compact; and
- a blocking step of filling, to form the blocked cells, some of the incomplete cells with the formation material for the plugs entirely in the axial direction at the same time as the plugging step or after the plugging step.

An alternative aspect is a method for manufacturing the honeycomb structural body, the method including:
- the molding step and the plugging step without the blocking step, wherein parts of the extrusion groove portion of the extrusion die for use in the molding step are openings corresponding to the blocked cells, the openings extending between two end faces and having an incomplete cell shape.

Still another aspect of the present disclosure is an exhaust gas purification filter including: an exhaust gas pipe path for an internal combustion engine; and the honeycomb structural body provided in the exhaust gas pipe path, wherein the honeycomb structural body is arranged in the exhaust gas pipe path such that the gas flow paths are aligned with the exhaust gas pipe path in the axial direction.

ADVANTAGEOUS EFFECTS OF THE INVENTION

The honeycomb structural body according to the above aspect has plugged cells blocked with plugs on the upstream side relative to the flow of gas. Some of the incomplete cells of the plugged cells are configured as blocked cells without gas flow paths. On the upstream side relative to the flow of gas, gas flows into penetrating cells and partly flows into plugged cells adjacent to the penetrating cells through the cell wall due to the difference in pressure between the penetrating cells and the plugged cells. On the downstream side relative to the flow of gas, in the case of a conventional one-side plug honeycomb structural body, there is no difference in pressure between plugged cells and penetrating cells adjacent to each other. To the contrary, in the case of the honeycomb structural body according to the above aspect, the pressure in penetrating cells adjacent to blocked cells is kept relatively high on the downstream side relative to the flow of gas. Therefore, the honeycomb structural body can maintain the flow of gas from penetrating cells to plugged cells not only on the upstream side but also on the downstream side relative to the flow of gas.

The honeycomb structural body is suitably used for an exhaust gas purification filter to let exhaust gas flow from penetrating cells to plugged cells adjacent thereto even on the downstream side relative to the flow of exhaust gas and collect particulate matter from the exhaust gas passing through the cell wall. Consequently, the exhaust gas purification filter can achieve a higher efficiency of collection of particulate matter than that including a conventional one-side plug honeycomb structural body. Such a honeycomb structural body can be manufactured by using an extrusion die including an extrusion groove portion to produce a honeycomb compact and filling incomplete cells of the honeycomb compact with the formation material for plugs to form blocked cells at the same time as or after the formation of plugs. Alternatively, such a honeycomb structural body can be manufactured by using an extrusion die including blocked parts corresponding to blocked cells and forming blocked cells at the same time as molding.

Thus, the above aspects can provide a honeycomb structural body that allows gas to pass through the cell wall defining adjacent cells even on the downstream side relative to the flow of gas and can achieve an improvement in the performance of collection of particulate matter from gas streams, a method for manufacturing the same, and an exhaust gas purification filter including the same.

BRIEF DESCRIPTION OF DRAWINGS

The above and other objects, characteristics, and advantages of the present disclosure will be further clarified in the following detailed description with reference to the accompanying drawings, in which.

DESCRIPTION OF EMBODIMENTS

First Embodiment

Figure 1:
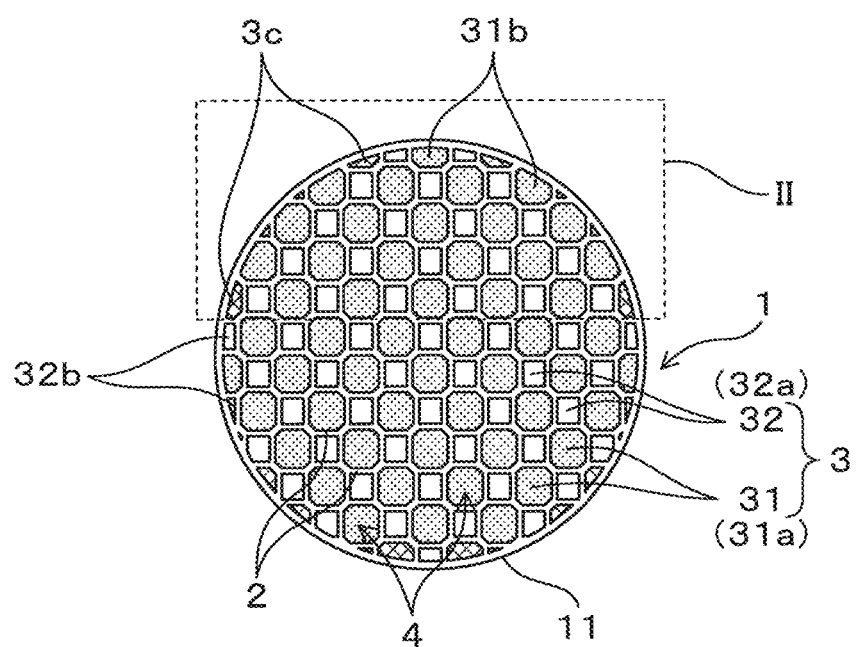
FIG. 1 is an upstream end view illustrating the shapes of cells and the arrangement of blocked cells in a honeycomb structural body according to the first embodiment.
Figure 2:
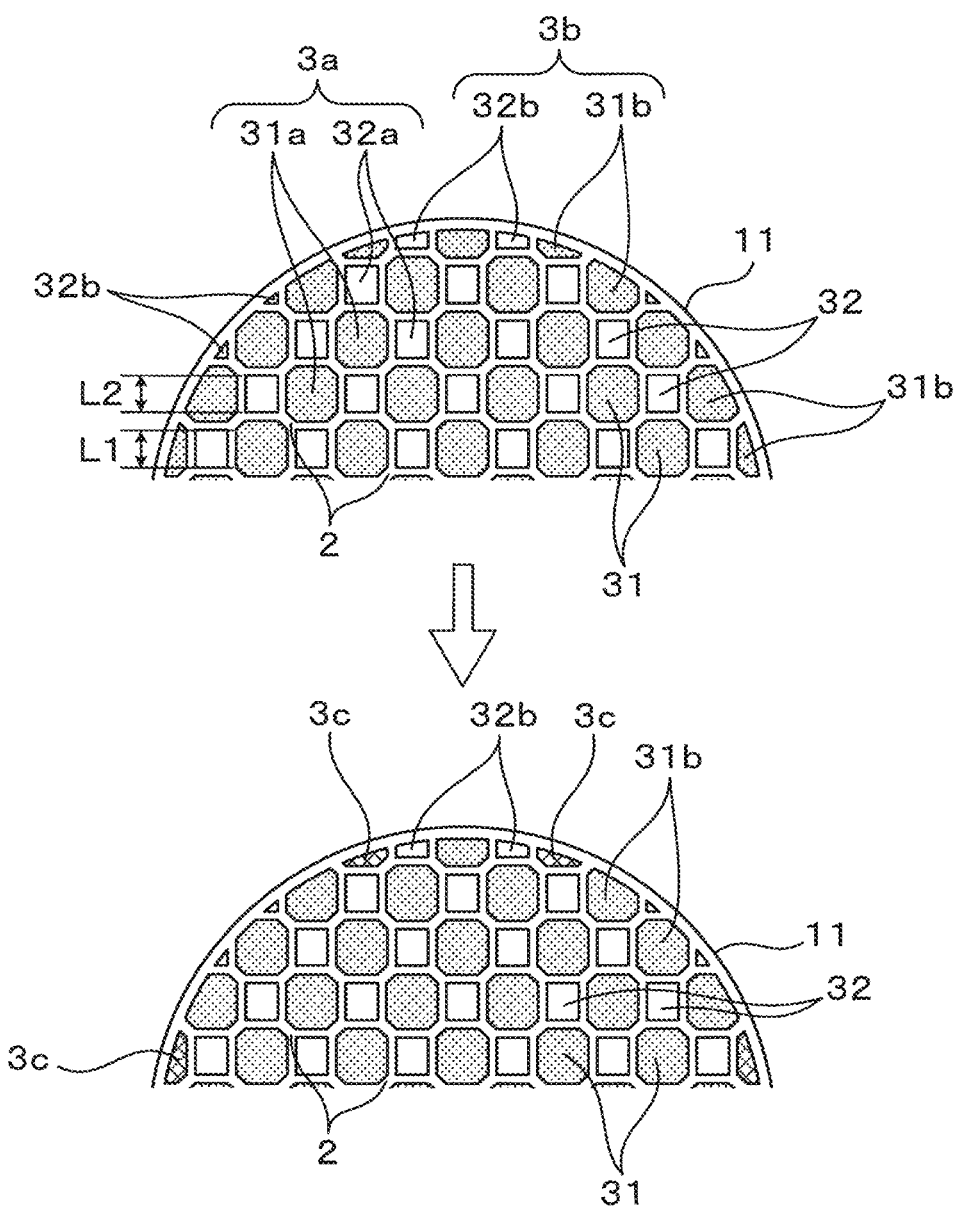
FIG. 2 is an enlarged view illustrating area II of FIG. 1, which is the principle part of the upstream end view of the honeycomb structural body according to the first embodiment.
Figure 3:
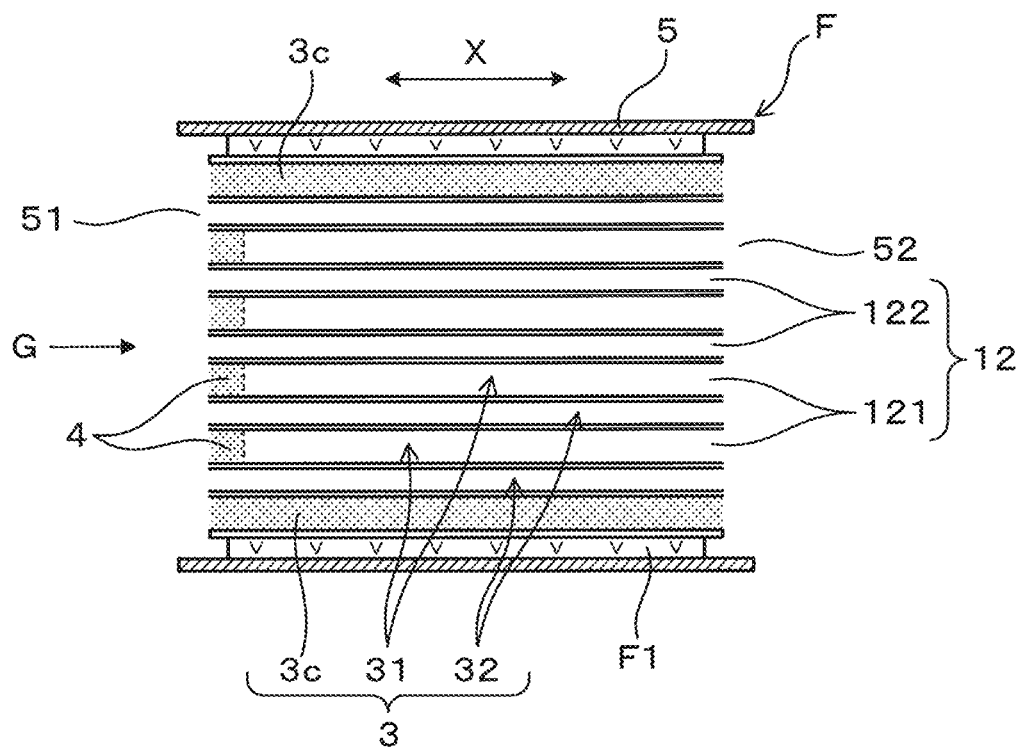
FIG. 3 is an axial cross-sectional view illustrating the honeycomb structural body according to the first embodiment.

A honeycomb structural body according to the first embodiment will be described with reference to FIGS. 1 to 5. As illustrated in FIGS. 1 to 3, the honeycomb structural body 1 has a columnar shape in its entirety, and includes a cylindrical casing 11 that is open at both ends, a porous cell wall 2 that partitions the cylindrical casing 11, and a large number of cells 3 surrounded by the cell wall 2. The large number of cells 3 form gas flow paths 12 extending in the axial direction X of the cylindrical casing 11. The honeycomb structural body 1 has a one-side plug structure, and has plugs 4 that alternately block the large number of cells 3 at the upstream end (for example, left end in FIG. 3) face of the gas flow paths 12. Consequently, the large number of cells 3 are divided into plugged cells 31 having the plugs 4 and penetrating cells 32 without plugs 4.

As illustrated in the partial enlarged view of FIG. 2 depicting the outer circumferential side, the honeycomb structural body 1 has, in its outermost part, a large number of incomplete cells 3b surrounded by the cylindrical casing 11 and the cell wall 2 and having an incomplete cross-sectional shape. The large number of incomplete cells 3b include plugged incomplete cells 31b that are some of the plugged cells 31 and penetrating incomplete cells 32b that are some of the penetrating cells 32. All the cells except the incomplete cells 3b are complete cells 3a totally surrounded by the cell wall 2 and having a predetermined cell shape. Unless otherwise specified, the plugged cells 31 mean plugged cells having a complete cell shape (that is, plugged complete cells 31a), and the penetrating cells 32 mean penetrating cells having a complete cell shape (that is, penetrating complete cells 32a).

At least some of the plugged incomplete cells 31b (some of the plugged cells 31) of the incomplete cells 3b have a cross-sectional area A1 smaller than the cross-sectional area B of the penetrating complete cells 32a, and are configured as blocked cells 3c that are blocked in their entirety in the axial direction X. The other plugged incomplete cells 31b have a cross-sectional area A1 equal to or larger than the cross-sectional area B of the penetrating complete cells 32a. In the present embodiment, these plugged incomplete cells 31b are not entirely blocked. The blocked cells 3c will be described in detail later.

For example, the honeycomb structural body 1 is arranged in the middle of an exhaust gas pipe path for an internal combustion engine (not illustrated) as the filter base material of an exhaust gas purification filter F illustrated in FIG. 3. The exhaust gas purification filter F is coaxially housed in a cylindrical case 5. An inlet 51 for exhaust gas G and an outlet 52 for exhaust gas G are provided at the two ends of the case 5. A cylindrical mat material F1 is interposed between the case 5 and the honeycomb structural body 1. The internal combustion engine is, for example, an automobile diesel engine, an automobile gasoline engine, or the like. The exhaust gas purification filter F collects particulate matter from the exhaust gas G discharged to the exhaust gas pipe path (not illustrated).

As illustrated in FIGS. 1 and 2, at the end face of the honeycomb structural body 1, the polygonal grid cell wall 2 is arranged inside the cylindrical casing 11 having a circular cross-sectional shape, and the large number of cells 3 each have a polygonal cross-sectional shape. The large number of cells 3 may have the same shape and the same cross-sectional area, or may have different shapes and different cross-sectional areas. The present embodiment employs two types of cells having different shapes and different cross-sectional areas: one is the plugged cells 31, and the other is the penetrating cells 32. The plugged cells 31 and the penetrating cells 32 are alternately arranged. The penetrating cells 32 have, for example, a quadrangular shape, whereas the plugged cells 31 have a polygonal shape having four or more vertices, e.g., an octagon shape. The penetrating cells 32 and the plugged cells 31 are surrounded by each other. Most of the plugged cells 31 and the penetrating cells 32 in the outermost part are the plugged incomplete cells 31b and the penetrating incomplete cells 32b.

The relation between the cross-sectional area A of the plugged complete cells 31a and the cross-sectional area B of the penetrating complete cells 32a is set to satisfy A≥B. Preferably, the plugged cells 31 are larger than the penetrating cells 32, and the relation between the cross-sectional area A of the octagon plugged cells 31 and the cross-sectional area B of the penetrating complete cells 32a satisfies A>B. In other words, it is desirable that the quadrangular penetrating cells 32 have a smaller cross-sectional area than the octagon plugged cells 31.

Specifically, the quadrangular penetrating cells 32 can each have a square shape whose four sides are equal in length L2, and the plugged cells 31 can each have an octagon shape whose four long sides adjacent to the respective sides of the quadrangular penetrating cells 32 have a length L1 and four short sides have a length smaller than the length L1. Each of the plugged cells 31 is adjacent to four penetrating cells 32 via the four long sides, and adjacent to four plugged cells 31 via the four short sides arranged between the four long sides. Note that all the octagon plugged cells 31 are sealed with the plugs 4 at the upstream end face. In addition to the complete octagon cells, incomplete octagon cells having an imperfect octagon shape are sealed with the plugs 4 to form plugged incomplete cells 31b.

Figure 4:
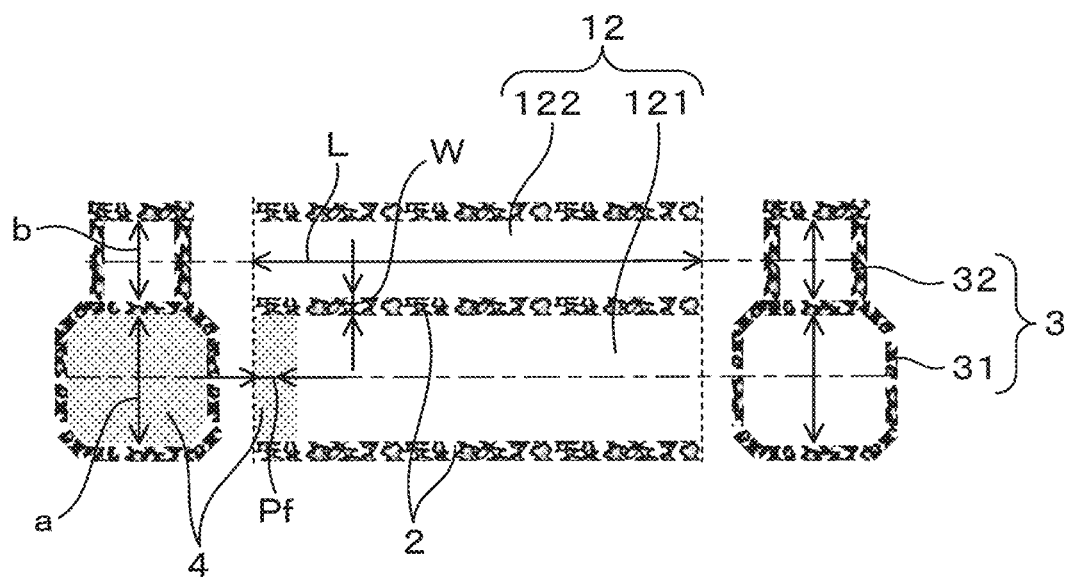
FIG. 4 is a partial enlarged axial cross-sectional view and a two-end view illustrating the honeycomb structural body according to the first embodiment.

As illustrated in FIGS. 3 and 4, the gas flow paths 12 extending in the axial direction X are formed inside the large number of cells 3. The gas flow paths 12 include plugged gas flow paths 121 formed inside the plugged cells 31 and penetrating gas flow paths 122 formed inside the penetrating cells 32. The penetrating gas flow paths 122 are open at both ends. Specifically, the penetrating gas flow paths 122 are open to the inlet 51 for exhaust gas G at the upstream end and open to the outlet 52 at the downstream end. Exhaust gas G flows from left to right in the figure. In contrast, the plugged gas flow paths 121 are plugged at the upstream end, and open to the outlet 52 only at the downstream end. The flow path length L of the gas flow paths 12 in the axial direction X is equal to the axial length of the honeycomb structural body 1. The flow path length of the plugged gas flow paths 121 is shorter than the flow path length L of the gas flow paths 12 by the plug length Pf of the plugs 4. The hydraulic diameter a of the plugged gas flow paths 121 is longer than the hydraulic diameter b of the penetrating gas flow paths 122.

The plugged gas flow paths 121 in the plugged cells 31 and the penetrating gas flow paths 122 in the penetrating cells 32 are adjacent to each other, defined by the cell wall 2 with a thickness W, and communicate with each other via the cell wall 2. The cell wall 2 of the honeycomb structural body 1 is a porous wall made of a ceramic material. Fine pores formed in the cell wall 2 communicate with each other to let exhaust gas G to flow from the penetrating gas flow paths 122 to the plugged gas flow paths 121. While exhaust gas G passes through the cell wall 2, particulate matter contained in the exhaust gas G can be collected by fine pores in the cell wall 2. Catalytic components can be applied to the surface of at least part of the cell wall 2. For example, an oxidation catalyst may be applied so as to purify components such as CO and HC contained in exhaust gas G.

Below is a description of the blocked cells 3c. As illustrated in FIG. 3, in the outermost part of the honeycomb structural body 1, at least the plugged incomplete cells 31b are plugged over the entire length in the axial direction X to form blocked cells 3c. Specifically, as illustrated in the upper view of FIG. 2, the honeycomb structural body 1 has a plurality of plugged incomplete cells 31b and penetrating incomplete cells 32b having different incomplete cell shapes inside the cylindrical casing 11. As illustrated in the lower view of FIG. 2, at least some of the plugged incomplete cells 31b of these incomplete cells have a cross-sectional area A1 smaller than the cross-sectional area B of the penetrating complete cells 32a, and are configured as blocked cells 3c that are blocked in their entirety (in short, A1<B). The blocked cells 3c can be formed using a ceramic material similar to that for the plugs 4.

Figure 5:
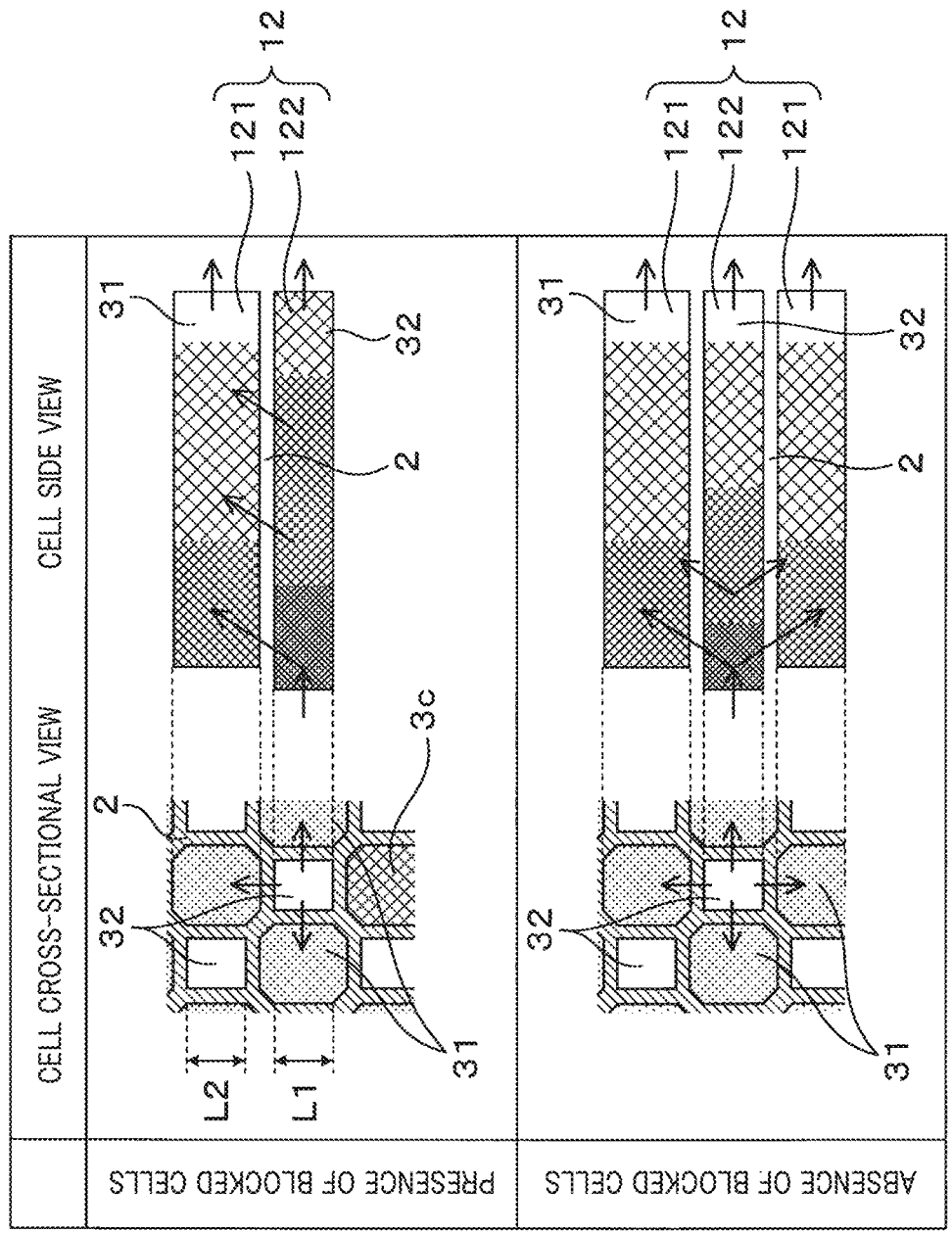
FIG. 5 is an enlarged axial cross-sectional view illustrating a comparison between the principle part of the honeycomb structural body according to the first embodiment and that of a conventional configuration without blocked cells in terms of the flow of gas from a penetrating cell to plugged cells adjacent thereto.

In this case, as illustrated in FIG. 5, at the upstream end face of the honeycomb structural body 1, exhaust gas G flows from the penetrating cell 32 into the penetrating gas flow path 122. As indicated by the grayscale in the gas flow paths 12 in the figure, the upstream pressure in the plugged gas flow path 121 is higher than the pressure in each plugged gas flow path 121 into which exhaust gas G does not flow. The difference in pressure between the penetrating gas flow path 122 and the plugged gas flow paths 121 adjacent thereto causes the exhaust gas G to flow through the porous cell wall 2 into the adjacent plugged gas flow paths 121. At this time, particulate matter in the exhaust gas G is collected into the cell wall 2.

However, in the conventional configuration without blocked cells 3c, the penetrating gas flow path 122 is surrounded by four plugged gas flow paths 122, whereby exhaust gas G passes through the cell wall 2 in the four directions. Consequently, the flow rate of the exhaust gas G is reduced, and the differential pressure between adjacent cells decreases as the exhaust gas G flows farther downstream. The differential pressure eventually becomes almost zero at the downstream end face. In contrast, in a case where some of the plugged incomplete cells 31b are configured as blocked cells 3c, exhaust gas G does not pass through the cell wall 2 to the blocked cells 3c, and thus passes through the cell wall 2 in the three directions. In this case, the volume flow rate in the penetrating gas flow path 122 does not significantly decrease on the downstream side, and the differential pressure between adjacent cells enables exhaust gas to pass through the cell wall 2.

The volume flow rate of gas through the cell wall 2 depends on the pipe friction differential pressure between adjacent cells. In general, the differential pressure $\Delta P$ is theoretically expressed using Formula 1 below.

$$\Delta P = [(fL\rho(v_2)^2/2d_2] - [(fL\rho(v_1)^2/2d_1] \quad \text{Formula 1:}$$

In Formula 1, f represents the coefficient of pipe friction, L represents the flow path length of the gas flow path 12, $\rho$ represents the density of exhaust gas, $v_1$ represents the flow rate in the plugged gas flow path 121, $v_2$ represents the flow rate in the penetrating gas flow path 122, $d_1$ represents the hydraulic diameter of the plugged gas flow path 121, and $d_2$ represents the hydraulic diameter of the penetrating gas flow path 122.

Formula 1 indicates that the differential pressure $\Delta P$ is proportional to the square of the difference in flow rate between cells, and that the differential pressure $\Delta P$ increases as the flow rate in the penetrating gas flow path 122 increases. Thus, providing the blocked cells 3c can prevent a significant reduction in the flow rate in the penetrating gas flow paths 122 to increase the volume flow rate of gas through the cell wall 2.

Therefore, PM collection can be performed throughout the honeycomb structural body 1, which improves the efficiency of collection. Note that the efficiency of collection per honeycomb structural body 1 (unit: mass %) can be expressed using Formula 2 below.

$$\text{Efficiency of collection} = 100 \times [\text{Mass of collected particulate matter}]/[\text{Mass of particulate matter inflow}] \quad \text{Formula 2:}$$

Formula 1 above also indicates that the differential pressure $\Delta P$ increases as the hydraulic diameter $d_1$ of the plugged gas flow path 121 becomes larger than the hydraulic diameter $d_2$ of the penetrating gas flow path 122. Thus, the volume flow rate of gas through the cell wall 2 increases and the efficiency of collection improves as the cross-sectional area A of the plugged complete cells 31a becomes larger than the cross-sectional area B of the penetrating complete cells 32a. Since the volume flow rate of exhaust gas G in the outer circumferential part of the honeycomb structural body 1 tends to be lower than that in the center of the honeycomb structural body 1, maintaining the flow rate especially in the outer circumferential part enables efficient collection and improves the efficiency of collection effectively.

In this case, preferably, it is desirable that the ratio A/B of the cross-sectional area A of the plugged complete cells 31a to the cross-sectional area B of the penetrating complete cells 32a be set in the range of 1.1 to 5. When the ratio A/B is equal to or higher than 1.1, the differential pressure $\Delta P$ between the plugged cells 31 and the penetrating cells 32 can be increased to enhance the efficiency of collection. The penetrating complete cells 32a having a relatively small cross-sectional area B are liable to cause an increase in pressure loss. Therefore, it is desirable that the ratio A/B be equal to or lower than 5 so as to prevent an increase in pressure loss.

Regarding the cell wall 2, for example, a reduction in thickness W or an increase in porosity causes a reduction in the relative strength of the honeycomb structural body 1, which makes it difficult to house the honeycomb structural body 1 in the case 51 (in other words, canning). In this regard, filling the plugged incomplete cells 31b is advantageous in reinforcing the outermost part, which increases the mechanical strength and enhances the canning performance.

Second Embodiment

Figure 6:
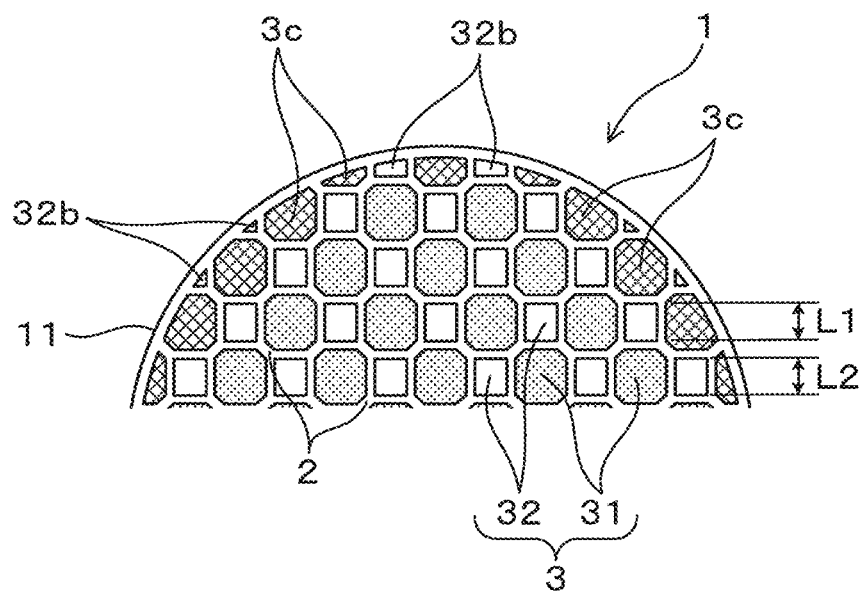
FIG. 6 is an enlarged view of the principle part of an upstream end view illustrating the shapes of cells and the arrangement of blocked cells in a honeycomb structural body according to the second embodiment.

As illustrated in FIG. 6 as the second embodiment, in the outermost part of the honeycomb structural body 1, all of the plurality of plugged incomplete cells 31b can be plugged over the entire length in the axial direction X to form blocked cells 3c. Specifically, in addition to the plugged incomplete cells 31b having a cross-sectional area A1 smaller than the cross-sectional area B of the penetrating complete cells 32a, the plugged incomplete cells 31b having a cross-sectional area A1 equal to or larger than the cross-sectional area B of the penetrating complete cells 32a are configured as blocked cells 3c that are blocked in their entirety. The penetrating incomplete cells 32b remain open at both ends. The other configurations are similar to those of the first embodiment, and descriptions thereof are omitted.

Unless otherwise specified, reference signs in the second and subsequent embodiments identical to those in former embodiments represent similar components or the like.

Figure 7:
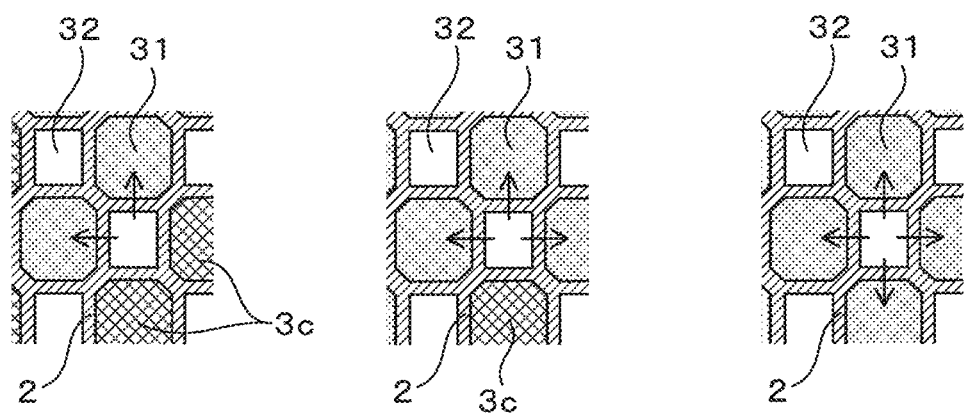
FIG. 7 is a partial enlarged axial cross-sectional view illustrating the honeycomb structural body according to the second embodiment and explaining the relation between the presence or absence of blocked cells and intra-cell pressure.

The number of blocked cells 3c provided in this case is larger than that in the first embodiment. Therefore, the differential pressure between cells can be increased, and the efficiency of collection of particulate matter can be improved effectively. Blocking a larger number of plugged incomplete cells 31b around penetrating cells 32 prevents a reduction in the flow rate in the penetrating cells 32 more effectively and causes a further increase in intra-cell pressure P. As illustrated in FIG. 7, for example, suppose one square penetrating cell 32 is adjacent to incomplete cells 3b on two sides and adjacent to plugged incomplete cells 31b on the other two sides. If there is no blocked cell 3c, gas passes through the cell wall 2 in the four directions, and the intra-cell pressure P is represented by P (four directions) (the same applies hereinafter). If one blocked cell 3c is adjacent to the penetrating cell 32, gas passes through the cell wall 2 in the three directions. If two blocked cells 3c are adjacent to the penetrating cell 32, gas passes through the cell wall 2 in the two directions. The intra-cell pressure P (three directions) is larger than the intra-cell pressure P (four directions), and the intra-cell pressure P (two directions) is larger than the intra-cell pressure P (three directions). In short, the following relation is satisfied: P (two directions)>P (three directions)>P (four directions). Thus, according to Formula 1 above, the difference in pressure and the efficiency of collection increase as the number of blocked cells 3c increases.

Regarding the side length of the large number of cells 3, it is desirable that the length L1 of the long side of the plugged cells 31 be equal to or larger than the length L2 of one side of the penetrating cells 32 (in short, L1>L2). In this case, parts of the cell wall 2 that are adjacent to the penetrating cells 32 are effectively utilized to facilitate gas permeation from the penetrating cells 32 to the plugged cells 31, so that the efficiency of collection can be further improved.

Regarding the inner circumferential shape of the large number of cells 3, the corners of the polygonal shape can have an R-shape. In a case where the cross-sectional area A of the plugged complete cells 31a is larger than the cross-sectional area B of the penetrating complete cells 32a, it is desirable that at least all the completely shaped plugged cells 31 located between the central part and the outer circumferential part have R-shaped inner circumferential corners. This reduces corner stress and improves strength against outer circumferential stress during canning, for example. The inner circumferential corners of the penetrating cells 32 can also have an R-shape. In this case, it is preferable that the inner circumferential corners R of the plugged cells 31 be larger than the inner circumferential corners R of the penetrating cells 32. Consequently, sufficient base material strength can be ensured without significantly reducing the hydraulic diameter of the penetrating cells 32 into which exhaust gas G flows.

If all the plugged incomplete cells 31b in the outermost part of the honeycomb structural body 1 are configured as blocked cells 3c, the outer circumferential part is further reinforced. An asymmetric cell structure can have poor outer circumferential strength in the plugged incomplete cells 31b having a larger cross-sectional area A1 than the penetrating cells 32. If these plugged incomplete cells 31b are entirely blocked, strength against external pressure is improved. Consequently, the canning performance is further enhanced.

In order to achieve still further improvement in the strength of the honeycomb structural body 1, not only the plugged incomplete cells 31b but also at least some or all of the penetrating incomplete cells 32b can be configured as blocked cells 3c. As in the above case, the mechanical strength is further improved as the number of blocked cells 3c increases. However, blocking the penetrating incomplete cells 32b hinders the flow of exhaust gas G through the upstream end face of the honeycomb structural body 1. Therefore, it is preferable to select blocked cells 3c appropriately from among the penetrating incomplete cells 32b to achieve both a desired volume flow rate of exhaust gas and strength while ensuring that the opening area on the upstream side of the honeycomb structural body 1 is not reduced excessively.

Figure 8:
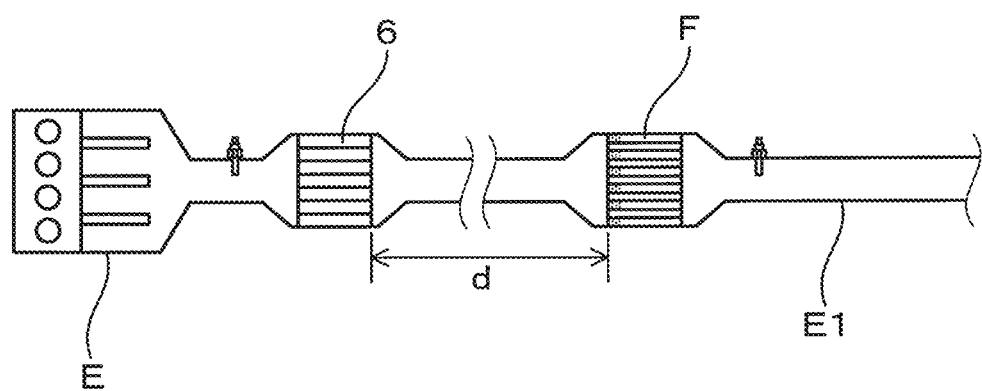
FIG. 8 is an overall schematic view illustrating an example of an exhaust gas purification device for an internal combustion engine including an exhaust gas purification filter provided with the honeycomb structural body according to the first embodiment.
Figure 9:
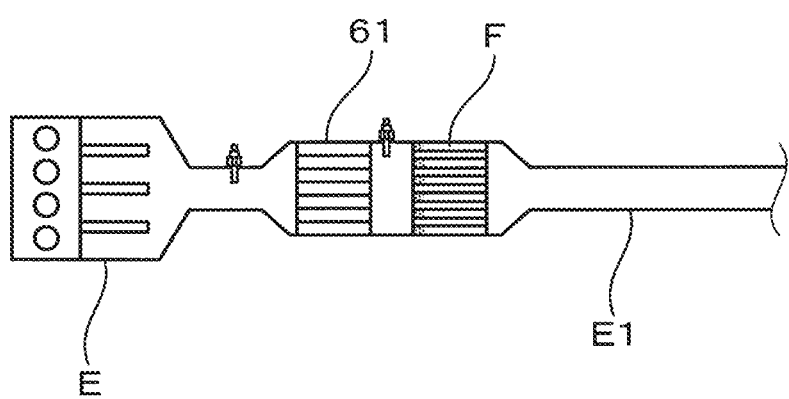
FIG. 9 is an overall schematic view illustrating another example of an exhaust gas purification device for an internal combustion engine including an exhaust gas purification filter provided with the honeycomb structural body according to the first embodiment.

Next, specific application examples of exhaust gas purification devices including the honeycomb structural bodies 1 according to the first and second embodiments will be described. As illustrated in FIGS. 8 and 9, the exhaust gas purification filter F including the honeycomb structural body having a one-side plug structure is arranged in the middle of an exhaust gas pipe path E1 for an engine E, i.e., an internal combustion engine, to constitute an exhaust gas purification device that purifies exhaust gas G containing particulate matter. The exhaust gas purification filter F needs to undergo thermal regeneration on a regular basis, depending on the arrangement thereof in the exhaust gas pipe path E1. It is therefore desirable that the configuration of the honeycomb structural body 1 be suitably selected in consideration of the efficiency of regeneration.

For example, in the exhaust gas purification device illustrated in FIG. 8, a start catalyst (S/C) catalyst 6 is arranged on the upstream side of the exhaust gas pipe path E1, and the exhaust gas purification filter F is arranged at a downstream under floor (UF) position of the vehicle. In this device, the exhaust gas temperature at the UF position is relatively low since the UF position is at a predetermined distance d (e.g., 100 cm) downstream from the S/C catalyst 6, for example. Therefore, regeneration control is performed for heating the exhaust gas purification filter F to a high temperature to burn off the collected particulate matter.

In this case, increasing the number of blocked cells 3c in the honeycomb structural body 1 causes an increase in heat capacity and a reduction in the efficiency of regeneration. Therefore, the configuration of the first embodiment having a smaller heat capacity is desirably employed. Consequently, the efficiency of collection and strength of the exhaust gas purification filter F can be improved, and the performance of collection can be maintained by performing thermal regeneration on a regular basis with a high efficiency of regeneration.

In contrast, the exhaust gas purification device illustrated in FIG. 9 has a tandem catalyst unit including a catalyst (e.g., an oxidation catalyst or a three-way catalyst) 61 arranged on the upstream side of the exhaust gas pipe path E1 and the exhaust gas purification filter F arranged on the downstream side. In this device, the catalyst 61 and the exhaust gas purification filter F are arranged close to each other. Therefore, hot exhaust gas G flows from the catalyst 61 into the exhaust gas purification filter F to enable spontaneous combustion of the collected particulate matter.

In this case, regeneration control is unnecessary, which allows the honeycomb structural body 1 to have a relatively large heat capacity. Therefore, the configuration of the second embodiment including a larger number of blocked cells 3c can be employed. Consequently, the efficiency of collection and strength of the exhaust gas purification filter F can be further improved.

Note that the configuration of the second embodiment can also be employed in the exhaust gas purification device illustrated in FIG. 8, for example, by making the distance between the exhaust gas purification filter F and the S/C catalyst 6 shorter than 100 cm to enable spontaneous combustion of the collected particulate matter.

Third Embodiment

Figure 10:
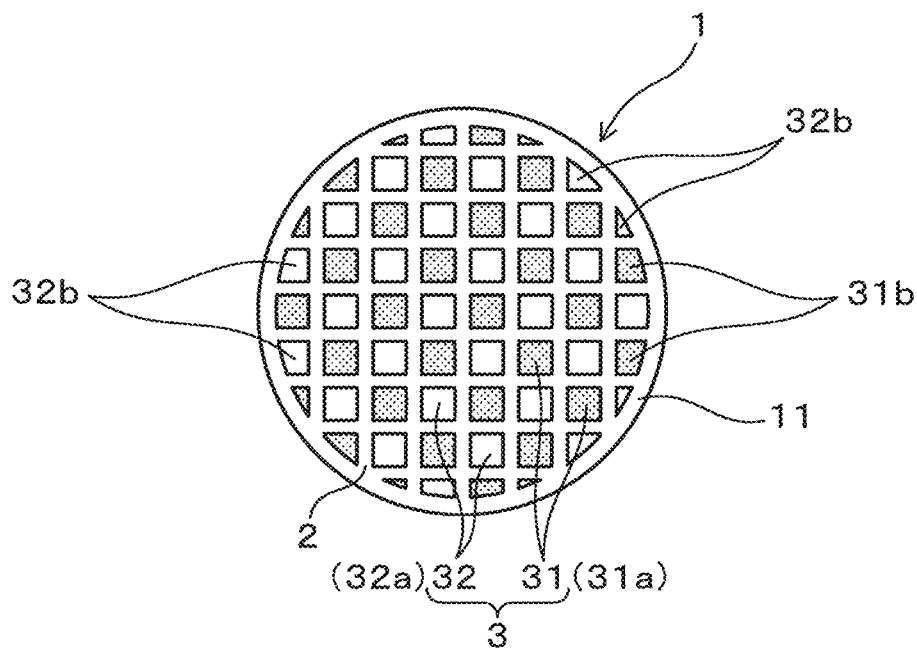
FIG. 10 is an upstream end view illustrating the shapes of cells and the arrangement of blocked cells in a honeycomb structural body according to the third embodiment.
Figure 10:
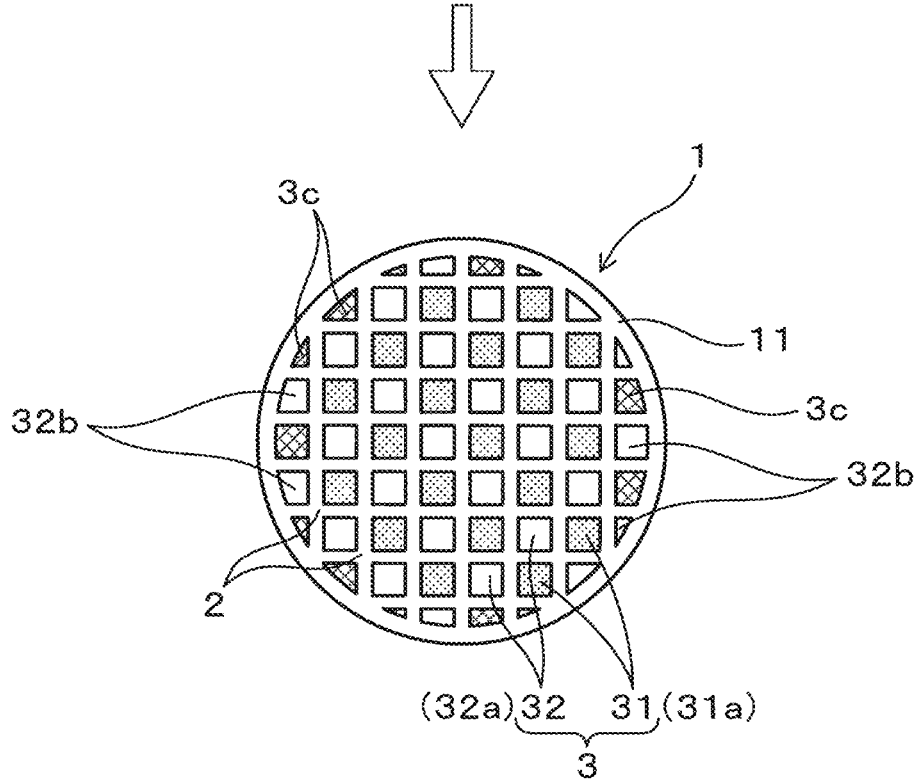
Figure 11:
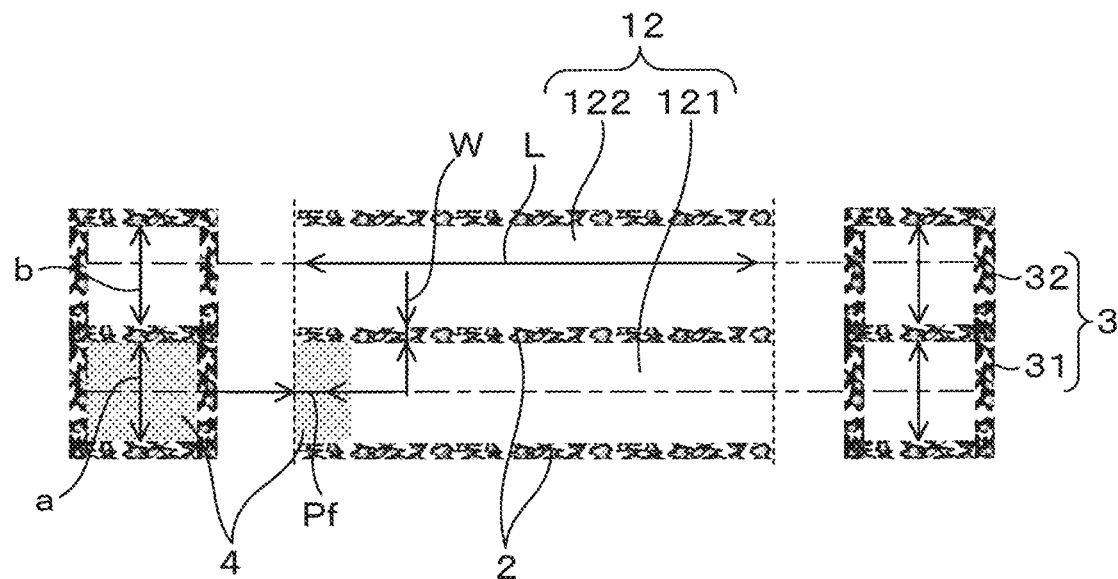
FIG. 11 is a partial enlarged axial cross-sectional view illustrating the honeycomb structural body according to the third embodiment.

In the first and second embodiments above, the honeycomb structural body 1 includes the two types of cells 3 having different shapes and different cross-sectional areas. Alternatively, the honeycomb structural body 1 may include one type of cell 3 having the same shape and the same cross-sectional area as illustrated in FIGS. 10 and 11 as the third embodiment. A large number of cells 3 constituting the honeycomb structural body 1 preferably have a polygonal shape, e.g., a quadrangular shape. The large number of cells 3 are alternately sealed with the plugs 4 at the upstream end face so that plugged cells 31 are formed, and the other cells 3 are configured as penetrating cells 32. The cross-sectional area A of the plugged complete cells 31a is the same as the cross-sectional area B of the penetrating complete cells 32a (in short, A=B). The plugged complete cells 31a and the penetrating complete cells 32a are surrounded by each other. The hydraulic diameter a of the plugged gas flow paths 121 is equal to the hydraulic diameter b of the penetrating gas flow paths 122.

As illustrated in the upper view of FIG. 10, the honeycomb structural body 1 configured in this manner also has, in its outermost part, a plurality of incomplete cells 3b, namely, plugged incomplete cells 31b and penetrating incomplete cells 32b. As in the second embodiment, all the plugged incomplete cells 31b are plugged over the entire length in the axial direction X to form blocked cells 3c. In a symmetric cell structure, the cross-sectional area A1 of the plugged incomplete cells 31b is smaller than the cross-sectional area B of the penetrating complete cells 32a without exception (in short, A1<B). Therefore, it is preferable that all the plugged incomplete cells 31b be configured as blocked cells 3c as illustrated in the lower view of FIG. 10. The penetrating incomplete cells 32b remain open at both ends. The other configurations are similar to those of the first embodiment, and descriptions thereof are omitted.

As in the first embodiment, providing the blocked cells 3c can increase the differential pressure between cells and improve the efficiency of collection of particulate matter. Although the cross-sectional area A of the plugged complete cells 31a is equal to the cross-sectional area B of the penetrating complete cells 32a, the mechanism for causing exhaust gas G to pass through the cell wall 2 by utilizing the difference in pressure between the plugged cells 31 with upstream end plugs 4 and the penetrating cells 32 can work in the same manner as in the previous case. Advantageously, the blocked cells 3c help maintain the difference in pressure even on the downstream side. It is difficult for a conventional technique to produce a difference in pressure throughout a symmetric cell structure, especially on the downstream side. In this embodiment, however, the entire honeycomb structural body 1 can be effectively utilized to improve the efficiency of collection in the symmetric cell structure. In addition, the blocked cells 3c plugged over the entire length can improve the strength of the outer circumferential part.

Fourth Embodiment

Figure 12:
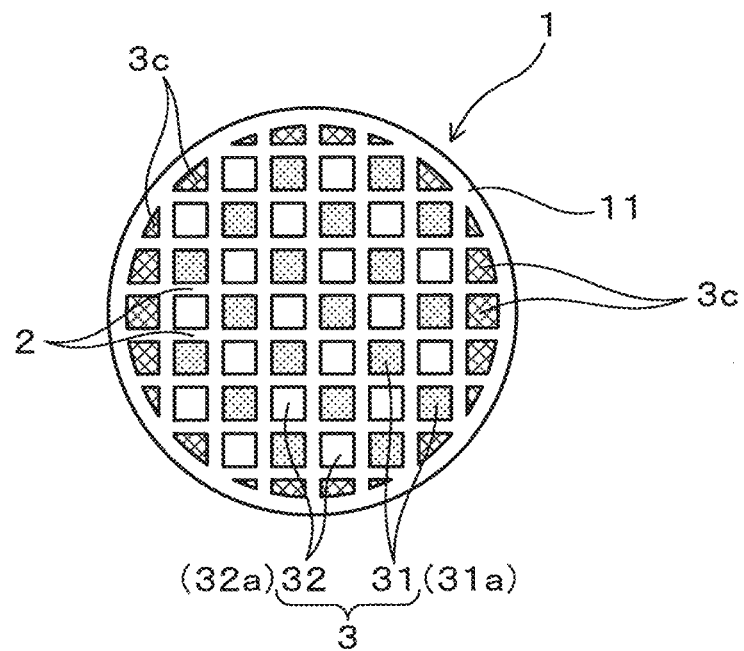
FIG. 12 is an upstream end view illustrating the shapes of cells and the arrangement of blocked cells in a honeycomb structural body according to the fourth embodiment.

As illustrated in FIG. 12 as the fourth embodiment, the honeycomb structural body 1 according to the third embodiment may be modified such that at least some of the penetrating incomplete cells 32b are further configured as blocked cells 3c. In this embodiment, not only all the plugged incomplete cells 31b in the outer circumferential part but also all the penetrating incomplete cells 32b are configured as blocked cells 3c. In the honeycomb structural body 1 having such a symmetric cell structure, the penetrating incomplete cells 32b can be configured as blocked cells 3c unless consideration of heat capacity is required. The mechanical strength is improved as the number of blocked cells 3c increases. The other configurations are similar to those of the third embodiment, and descriptions thereof are omitted.

As in the second embodiment, providing a larger number of blocked cells 3c in the outer circumferential part can lead to a further increase in the differential pressure between cells and improve the efficiency of collection of particulate matter. Since all the plugged incomplete cells 31b in the outermost part of the honeycomb structural body 1 are configured as blocked cells 3c, strength against external pressure is further improved, and the canning performance is further enhanced.

The honeycomb structural body 1 configured as described above can be manufactured in the following manner. Specifically, a method for manufacturing the honeycomb structural body 1 includes:

a molding step of using an extrusion die including an extrusion groove portion having a shape corresponding to the cell wall 2 and the cylindrical casing 11, and supplying a molding material for the honeycomb structural body 1 to the extrusion groove portion to extrude the molding material into a honeycomb structure;

a plugging step of filling, to form the plugged cells 31, some of the cells 3 with a formation material for the plugs 4 on one end face side of an obtained honeycomb compact; and a blocking step of filling, to form the blocked cells 3c, some of the incomplete cells 3b with the formation material for the plugs 4 entirely in the axial direction X at the same time as the plugging step or after the plugging step.

The extrusion die for use in the molding step can be a die including an extrusion groove portion corresponding to the honeycomb structural body 1 to be manufactured. The extrusion groove portion includes an annular groove formed in the part corresponding to the cylindrical casing 11 and a polygonal grid groove formed in the inner part corresponding to the cell wall 2. The extrusion groove portion is formed through the two end faces of the extrusion die. A formation material is supplied to the extrusion groove to form the honeycomb structural body 1 including cells 3, all of which are open at both ends. Then, predetermined parts of the honeycomb structural body 1 are plugged to form plugged cells 31 having plugs 4. Furthermore, at least some of the plugged cells 31 are entirely filled with the formation material for the plugs 4 so that blocked cells 3c are formed.

Alternatively, the honeycomb structural body 1 can be manufactured in a different manner that does not include the blocking step by changing the structure of the molding die. Specifically, the method includes:

a molding step of using an extrusion die including an extrusion groove portion having a shape corresponding to the cell wall 2 and the cylindrical casing 11, and supplying a molding material for the honeycomb structural body 1 to the extrusion groove portion to extrude the molding material into a honeycomb structure; and a plugging step of filling, to form the plugged cells 31, some of the cells 3 with a formation material for the plugs 4 on one end face side of an obtained honeycomb compact, wherein parts of the extrusion groove portion of the extrusion die for use in the molding step are openings corresponding to the blocked cells 3c, the openings extending between two end faces of the die and having an incomplete cell shape.

The basic configuration of the extrusion die is similar to that in the above method. The extrusion groove portion includes an annular groove formed in the part corresponding to the cylindrical casing 11 and a polygonal grid groove formed in the inner part corresponding to the cell wall 2. Parts of the extrusion die, corresponding to the blocked cells 3c, are configured as openings having the shapes of the respective blocked cells 3c. Such openings are formed by leaving the gaps between the corresponding parts of the groove open. Consequently, the formation of the blocked cells 3c is completed in the molding step at the same time as extrusion. After that, some of the completely shaped cells 3 are sealed with plugs 4 in the plugging step to form plugged cells 31, whereby the honeycomb structural body 1 is obtained.

Preferably, the molding material for the honeycomb structural body 1 is at least one type of ceramic material selected from a group consisting of cordierite, silicon carbide, silicon-silicon carbide composite, mullite, alumina, spinel, silicon carbide-cordierite composite, lithium aluminum silicate, and aluminum titanate. Cordierite, which is excellent in thermal shock resistance with a small coefficient of thermal expansion, is preferable to the other materials. Although any cordierite raw material can be used, a desirable cordierite raw material includes a plurality of ceramic raw materials that react with each other while being fired to form cordierite. Examples of such ceramic raw materials include silica, talc, kaolin, calcined kaolin, alumina, aluminum hydroxide, and magnesium hydroxide.

Such ceramic raw materials are mixed with a solvent such as water, a thickener, a dispersant, and the like to form a molding material. Other additives such as an organic binder, a pore-forming agent, and a surfactant can be added. The resultant molding material having clay-like properties is kneaded into clay. The obtained clay is molded into a honeycomb shape in the molding step. The extrusion die with a desired cell shape, cell wall thickness W, and cell density is used for extrusion molding of the clay into a honeycomb compact.

Next, in the plugging step, the cells 3 corresponding to the plugged cells 31 are sealed with a plug forming material for the plugs 4 at one end face (inlet end face) of the honeycomb compact. At this time, the cells 3 corresponding to the penetrating cells 32 are masked in advance, and the one end face is immersed in the plug forming material, whereby the plugged cells 31 alone can be sealed.

Furthermore, in the blocking step, desired cells 3 are selected from among the outermost plugged incomplete cells 31b and filled with the plug forming material to form blocked cells 3c. The plug forming material can be the same as the ceramic material constituting the honeycomb structural body 1. Any filling method can be employed. For example, a plug forming material slurry can be injected using a syringe or the like into desired cells 3 through the inlet face side to the outlet face side of the honeycomb compact. Alternatively, a plug forming material slurry may be put into only desired cells 3 using vacuum suction, or may be injected using an instrument such as a dispenser. Still alternatively, an extrusion molding die may be designed and manufactured such that a honeycomb compact including completely filled parts between the two end faces is formed through extrusion molding. Consequently, some or all of the plugged incomplete cells 31b can form blocked cells 3c plugged over the entire length in the axial direction X.

Next, the honeycomb compact is dried and subjected to a firing step so that the honeycomb structural body 1 is formed. Examples of drying methods include, but are not limited to, hot-air drying, microwave drying, dielectric drying, reduced-pressure drying, vacuum drying, and freeze drying. Preferably, dielectric drying, microwave drying, or hot-air drying is performed either alone or in combination. Drying conditions preferably include a drying temperature in the range of 30 to 1500 and a drying time in the range of one minute to two hours. The firing temperature may be any temperature equal to or higher than the sintering temperature of the ceramic material for the honeycomb structural body 1, and can be appropriately determined in accordance with the ceramic material to be used. For example, in the case of cordierite, the firing temperature is preferably in the range of 1380 to 1450□, and more preferably in the range of 1400 to 1440□. The firing time is preferably in the range of about 3 to 10 hours.

The procedure of obtaining the honeycomb structural body 1 can further include adjusting the internal porosity of the cell wall 2 by adding a pore-forming agent to the ceramic material. The porosity of the cell wall 2 is preferably in the range of, but is not limited to, 50 to 80%, for example, and more preferably in the range of 55 to 70%. Any porosity less than 50% could significantly reduce the performance of collection, whereas any porosity greater than 80% could reduce the strength of the honeycomb structural body 1, making it difficult to perform canning. The cell wall 2 having a porosity in the range of 55 to 70%, and more preferably in the range of 55 to 67%, can stably achieve an efficiency of collection of 35 mass % or more. Such a cell wall 2 can also improve the strength of the honeycomb structural body 1 to facilitate canning.

The thickness of the cell wall 2 is preferably in the range of, but is not limited to, 0.1 to 0.4 mm, for example, and more preferably in the range of 0.12 to 0.38 mm. The cell wall 2 with a thickness less than 0.1 mm could reduce the strength of the honeycomb structural body 1, whereas the cell wall 2 with a thickness greater than 0.4 mm could reduce the performance of collection and increase pressure loss. The exhaust gas purification filter F for a diesel engine that emits exhaust gas G containing a relatively large amount of PM typically has a low cell density. Therefore, the cell wall 2 preferably has a thickness in the range of 0.20 to 0.38 mm so as to achieve a good balance between strength and collection performance. The exhaust gas purification filter F for a gasoline engine that emits exhaust gas G containing a relatively small amount of PM typically has a high cell density. Therefore, the cell wall 2 preferably has a thickness in the range of 0.12 to 0.30 mm so as to achieve a good balance between strength and collection performance. The thickness of the cell wall 2 can be measured, for example, by observing the cross-section of the honeycomb structural body 1 taken in the axial direction X through a microscope.

The cell density (i.e., the number of cells per unit area on the cross-section orthogonal to the axial direction X) of the honeycomb structural body 1 is preferably in the range of, but is not limited to, 15 to 100 cells/cm$^2$, for example. Any cell density less than 15 cells/cm$^2$ could reduce the performance of collection, whereas any cell density greater than 100 cells/cm$^2$ could cause deposition of particulate matter in the vicinity of the upstream end face and increase pressure loss. For diesel engines, the cell density is more preferably in the range of 20 to 70 cells/cm$^2$. For gasoline engines, the cell density is more preferably in the range of 30 to 100 cells/cm$^2$. Exhaust gas G discharged from a gasoline engine contains a small amount of PM and thus has a low risk of blocking the cells 3. Therefore, the cell density can be increased to enhance the performance of collection.

The average pore diameter of the cell wall 2 is preferably in the range of, but is not limited to, 5 to 50 μm, for example, and more preferably in the range of 10 to 30 μm. Any average pore diameter less than 5 μm could increase pressure loss even when the rate of deposition of particulate matter is low, whereas any average pore diameter greater than 50 μm could weaken the honeycomb structural body 1 or allow penetration of particulate matter into the cell wall 2 to cause depth filtration. The cell wall 2 having an average pore diameter of 10 μm or more with an oxidation catalyst on, for example, is unlikely to cause an increase in permeation resistance. The cell wall 2 having an average pore diameter of 30 μm or less is unlikely to cause deposition of ash therein, and thus unlikely to deteriorate the performance of collection even after long-term use. The average pore diameter of the cell wall 2 can be measured with a mercury porosimeter, for example.

The cylindrical casing 11 and the plugs 4 of the honeycomb structural body 1 are also formed using a ceramic material. The thickness of the cylindrical casing 11 is preferably in the range of, but is not limited to, 0.2 to 2 mm, for example. Any thickness less than 0.2 mm could lead to a reduction in the strength since outer circumferential cells chip easily, whereas any thickness greater than 2 mm could increase pressure loss. The plug length Pf of the plugs 4 is preferably in the range of, but is not limited to, 0.5 to 10 mm, for example. Any plug length Pf equal to or greater than 0.5 mm enables sufficient blocking of the cells 3 at the upstream end face. Any plug length Pf equal to or less than 10 mm can prevent an increase in heat capacity to maintain the efficiency of thermal regeneration.

The shape of the honeycomb structural body 1 is preferably, but is not limited to, a columnar shape, a pillar shape with an elliptic bottom, or a polygonal pillar shape with a quadrangular, pentagonal, or hexagonal bottom. The honeycomb structural body 1 preferably has a pillar shape in which the cells 3 extend in the axial direction X.

Regarding the size of the honeycomb structural body 1, the flow path length L of the gas flow paths 12 formed in the cells 3 is preferably in the range of, but is not limited to, 40 to 200 mm. The exhaust gas purification filter F having a flow path length L in this range enables processing of exhaust gas G with an excellent performance of collection without increasing pressure loss. The collection performance of the honeycomb structural body 1 with a flow path length L less than 40 mm is only slightly better than that of a conventional honeycomb structural body, and the effect of completely filling the outermost incomplete cells 3b to form blocked cells 3c may not be obtained. With a flow path length L greater than 200 mm, no further improvement in collection performance can be expected; on the contrary, it can cause an increase in pressure loss. In terms of the balance between collection performance and pressure loss, the flow path length L is more preferably in the range of 60 to 130 mm, so that the effect of completely filling the outermost incomplete cells 3b to form blocked cells 3c can be successfully obtained.

Test Example 1

Figure 13:
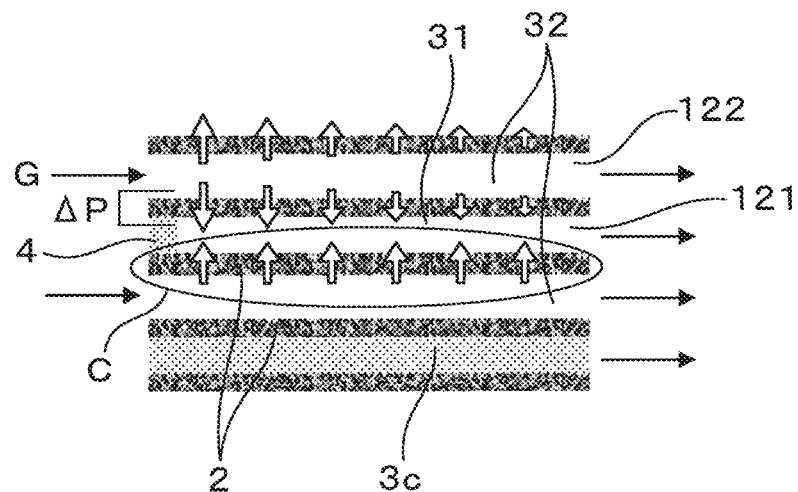
FIG. 13 is a partial enlarged axial cross-sectional view illustrating changes in the flow rate through the wall of a honeycomb structural body including blocked cells according to Test Example 1.

The relation between the flow path length L, or the axial length, of the honeycomb structural body 1 and the performance of collection was investigated in the following manner. Simulation analyses were conducted on the base material models illustrated in FIGS. 13 and 14 to examine changes in the flow rate of gas through the gas flow paths 12 in the base materials from the upstream side to the downstream side in the axial direction X. The result is shown in FIG. 15. The base material model in FIG. 13 is the honeycomb structural body 1 having the symmetric cell structure according to the above third embodiment with the blocked cells 3c. This base material model was compared with the base material model in FIG. 14 having a conventional structure without blocked cells 3c. The analysis software StarCCM+Vol. 10.02 was used. The basic principle of calculation was based on the Navier-Stokes equations.

Boundary conditions were as follows:

Mesh size=0.5 mm

Prism layer thickness=0.1 mm

Prism layers=2

Number of meshes=350,000

Figure 16:
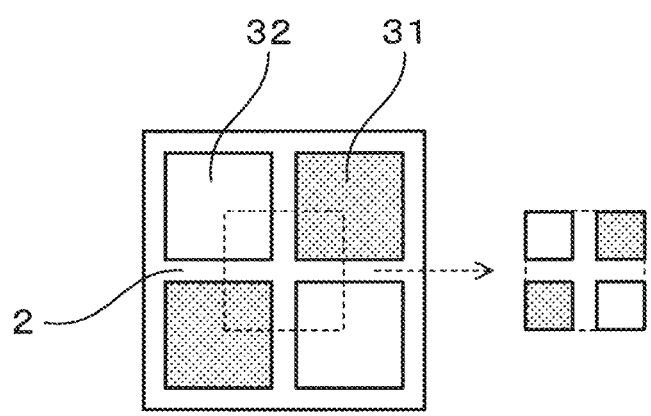
FIG. 16 is a partial enlarged upstream end view of a honeycomb structural body for explaining the analysis range for simulations in Test Example.

As illustrated in FIG. 16, two plugged cells 31 and two penetrating cells 32 alternately arranged around an intersection of the grid cell wall 2 were partly designated as the analysis range. One of the two plugged cells 31 of the base material model in FIG. 13 was configured as a blocked cell 3c. Gas was introduced into the penetrating cells 32 through the inlet under the following conditions, and gas permeation to the plugged cells 31 was examined over the entire length in the axial direction X.

Temperature [t]=450

Penetrating cell inflow [m$^3$/min]=0.00109

Penetrating cell inflow rate [m/s]=11.4

Wall thickness W [mm]=0.203

Inertia resistance coefficient α [kg/m$^4$]=1.6e+6

Viscous resistance coefficient β [kg/(m$^3$·s)]=5.0e+6

Density at 450° C. [kg/m$^3$]=0.48799

Viscosity at 450° C. [kg/(m$^3$·s)]=3.4835e−5

Pore diameter [μm]=18

Porosity [%]=60

Plug length Pf [mm]=5

Flow path length L [mm]=100

Cell pitch [mm]=1.263

Penetrating cell outflow pressure [Pa]=0

Figure 14:
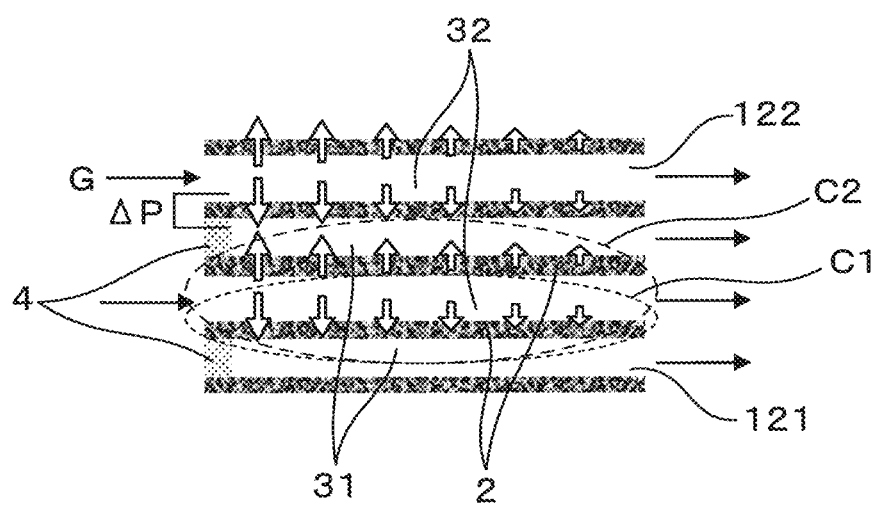
FIG. 14 is a partial enlarged axial cross-sectional view illustrating changes in the flow rate through the wall of a honeycomb structural body without blocked cells according to Test Example 1.
Figure 15:
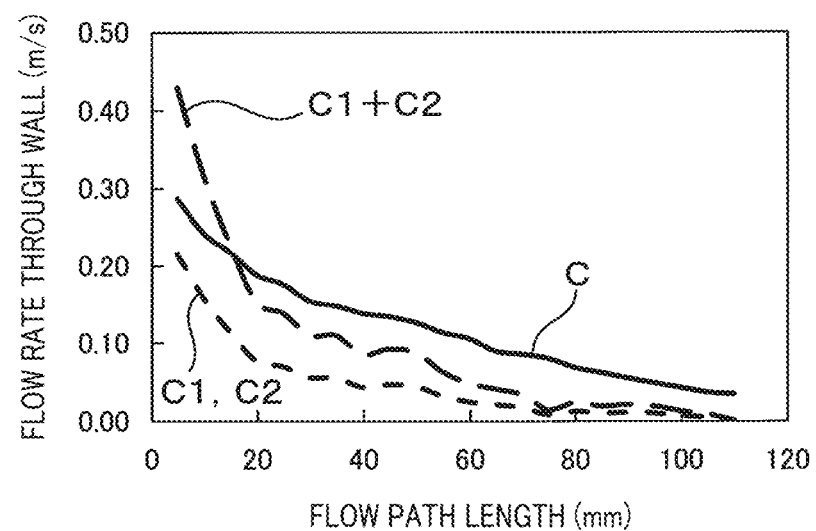
FIG. 15 is a diagram illustrating a comparison between the honeycomb structural body including blocked cells and the honeycomb structural body without blocked cells in terms of the relation between base material length and the flow rate through the wall according to Test Example 1.

As schematically illustrated by white arrows in FIGS. 13 and 14, the flow of gas through the cell wall 2 significantly depends on whether the penetrating cells 32 are adjacent to blocked cells 3c. In the cross-section of the base material illustrated in FIG. 13, the penetrating cell 32 adjacent to the blocked cell 3c is sandwiched between two parts of the cell wall 2. One of the two parts of the cell wall 2 is adjacent to the blocked cell 3c, and thus does not allow a flow of gas. Although the other part of the cell wall 2 alone (that is, solid line c in the figure) contributes to the collection of PM, its permeability to gas is stable over the entire length of the base material. In contrast, in the cross-section of the base material illustrated in FIG. 14, the penetrating cell 32 is sandwiched between two parts of the cell wall 2 (that is, dotted lines c1 and c2 in the figure) communicating with the plugged cells 31, and both of the two parts of the cell wall 2 contribute to the collection of PM. However, the flow of gas through the wall decreases as the gas flows farther downstream.

In this case, as illustrated in FIG. 15, on the upstream side relative to the flow of gas, the sum (that is, broken line c1+c2 in the figure) of the flow rates through the two parts of the cell wall 2 sandwiching the penetrating cell 32 is higher than the flow rate (that is, c in the figure) through the wall from the penetrating cell 32 adjacent to the blocked cell 3c to the plugged cell 31. However, the difference between them is rapidly reduced, and the flow rate c even exceeds the sum of flow rates c1+c2. For example, at a base material length of 20 cm, the flow rate through the wall in the presence of the blocked cell 3c is higher than the sum of the flow rates through the two parts of the cell wall 2. Subsequently, the difference tends to remain constant or increase gradually. For example, at a base material length of 40 cm, the flow rate c and the sum of flow rates c1+c2 become equivalent in total gas volume through the wall from the upstream side. The effect of the blocked cell 3c increases as the base material length becomes greater than 40 cm. For example, at a base material length of 60 cm, the effect of the blocked cell 3c becomes sufficiently large.

Example 1

A cordierite honeycomb structural body 1 having the asymmetric cell structure according to the above second embodiment was manufactured and subjected to an evaluation test. The honeycomb structural body 1 had a columnar shape with an outer diameter φ of 130 mm and a flow path length L of 100 mm. One end face of the honeycomb structural body 1 was blocked with plugs 4 so that the honeycomb structural body 1 had a one-side plug structure. The honeycomb structural body 1 had a large number of cells 3 alternately including penetrating cells 32 with a quadrangular cross-sectional shape and plugged cells 31 with an octagonal cross-sectional shape. The cell density was 46.5 cells/cm$^2$ (=300 cells/inch2). The wall thickness W of the cell wall 2 was 0.2 mm. The average pore diameter was 18 µm. The porosity was 62%.

As described in Table 1, in Example 1, the ratio A/B of the cross-sectional area of the octagon plugged cells 31 to the cross-sectional area of the quadrangular penetrating cells 32 was 1.05. In the honeycomb structural body 1, both the plugged incomplete cells 31b having a cross-sectional area A1 smaller than the cross-sectional area B of the penetrating complete cells 32a (that is, small cross-sectional area in the table) and the plugged incomplete cells 31b having a cross-sectional area A1 equal to or larger than the cross-sectional area B of the penetrating complete cells 32a (that is, large cross-sectional area in the table) were configured as blocked cells 3c by being completely filled with the plug forming material. Below is a specific method for manufacturing the honeycomb structural body 1.

First, a cordierite raw material was prepared by blending raw powders such as silica, talc, kaolin, alumina, and aluminum hydroxide in a manner that made a cordierite composition. The raw material composition of the cordierite raw material was adjusted to achieve the following final composition after firing: 47 to 53 mass % $SiO_2$, 32 to 38 mass % $Al_2O_3$, and 12 to 16 mass % MgO. The cordierite raw material was mixed with a solvent such as water, a thickener, a dispersant, and the like to form a molding material having argillaceous properties. Other additives such as an organic binder, a pore-forming agent, and a surfactant were added to the molding material, which was kneaded into clay.

Next, the obtained clay was extruded into a honeycomb shape so that a honeycomb compact was obtained. The honeycomb compact had an asymmetric cell structure including quadrangular cells corresponding to the penetrating cells 32 and octagon cells corresponding to the plugged cells 31 as described in the above first and second embodiments. The honeycomb compact was integrally extruded using an extrusion die having a grid groove corresponding to the cell wall 2.

Next, a plug forming material was prepared by blending the above-mentioned raw powders in a manner that made a cordierite composition. The plug forming material was added into a solvent such as water or oil, and stirred and uniformly dispersed together with a thickener, a dispersant, and the like using a mixing machine to form a slurry.

Masking tape was applied to both end faces of the obtained honeycomb compact and partly removed, whereby openings were formed at one end face only in the cells corresponding to the plugged cells 31. The removal of masking tape was performed, for example, by irradiation of laser light. Specifically, a laser irradiation device was arranged in front of the end face of the honeycomb compact. The end face was continuously irradiated while the position of irradiation was appropriately moved by a control device. Thus, the masking tape was partly removed, exposing the corresponding cells to be plugged.

Next, the one end face of the honeycomb compact was immersed in the plug forming material slurry. Consequently, an appropriate amount of plug forming material was introduced through the openings into the cells to be plugged. Furthermore, some of the incomplete cells 3b of the outermost cells 3 were filled with the plug forming material slurry to form blocked cells 3b. In this example, the plug forming material slurry was injected using a syringe or the like into all the plugged incomplete cells 31b through the inlet face side to the outlet face side of the honeycomb compact.

The honeycomb compact was dried, and fired at a temperature in the range of 1400 to 1440° C. Consequently, the honeycomb compact and the plug forming material were sintered to form the cordierite honeycomb structural body 1 having plugs 4 at the one end face and blocked cells 3c in all of the plugged incomplete cells 31b.

Examples 2 and 3, Comparative Example 3

Similarly, cordierite honeycomb structural bodies 1 having the symmetric cell structures according to the third and fourth embodiments were manufactured. Both the plugged cells 31 and the penetrating cells 32 had a quadrangular shape. The cell cross-sectional area ratio A/B was therefore 1.0. All the other conditions for molding honeycomb compacts were the same as those for Example 1. Plugs 4 were formed at one end face of each honeycomb structural body. Next, as described in Table 2, all the plugged incomplete cells 31b of the honeycomb structural body 1 (Example 2) were filled with the plug forming material to form blocked cells 3c. As well as the plugged incomplete cells 31b, the penetrating incomplete cells 32b of the honeycomb structural body 1 (Example 3) were filled with the plug forming material so that all the incomplete cells 3b were configured as blocked cells 3c. Furthermore, for the purpose of comparison, another honeycomb structural body without blocked cells 3c was manufactured as Comparative Example 1 by leaving the plugged incomplete cells 31b unfilled.

Each of the obtained honeycomb structural bodies 1 of Examples 2 and 3 and Comparative Example 1 was subjected to the following test so that its efficiency of collection of particulate matter was evaluated. In the evaluation test, the exhaust gas purification filter F equipped with the honeycomb structural body 1 was attached to the exhaust gas pipe path E1 for the gasoline engine E. Then, exhaust gas G containing particulate matter was introduced to the exhaust gas purification filter F. The exhaust gas G had a temperature of 700□ and a volume flow rate of 4 $m^3$/min. Table 1 shows the efficiency of collection (unit: mass %) calculated based on Formula 2 above together with measured isostatic strength (unit: MPa) and heat capacity.

The heat capacity was evaluated on a three-point scale of A to C based on the ratio of the heat capacity of the honeycomb structural body 1 having blocked cells 3c in some or all of the incomplete cells 3b to the reference heat capacity (one) of the honeycomb structural body 1 with a one-side plug filter structure including only plugs 4.

A: ratios lower than 1.03
B: ratios equal to or higher than 1.03 and less than 1.05
C: ratios equal to or higher than 1.05

As described in Table 1, the honeycomb structural body 1 of Comparative Example 1 having a symmetric cell structure without blocked cells 3c had an efficiency of collection of 33 mass % and an isostatic strength of 0.85 MPa. In contrast, Examples 1 and 2 having blocked cells in all the plugged incomplete cells 31b had an efficiency of collection of 39 mass % and an isostatic strength of 1.4 MPa, which were greater than those of Comparative Example 1. The heat capacities of the honeycomb structural bodies 1 of Examples 1 and 2 were both ranked as B, showing that the blocked cells 3c did not cause a significant decrease in heat capacity.

This result indicates that blocking the outermost plugged incomplete cells 31b can improve both the efficiency of collection and the strength of the honeycomb structural body 1 having a symmetric cell structure or an asymmetric cell structure with a low cell cross-sectional area ratio. Since the influence of blocking on heat capacity is small, a reduction in the efficiency of regeneration can be prevented after the collection of PM. Regarding Example 3 having blocked cells in all the incomplete cells 3b, the efficiency of collection was 39 mass %, which was the same as those of Examples 1 and 2, and the heat capacity was ranked as C. However, the isostatic strength was 1.8 MPa, which was much greater than those of Examples 1 and 2. Therefore, in a case where regeneration control is not performed, the configuration of Example 3 can be employed to enhance the canning performance of the honeycomb structural body 1.

TABLE 1

| Example Comparative Example | A/B | Plugged cells (incomplete) | Penetrating cells (incomplete) | Efficiency of collection (%) | Strength (MPa) | Heat capacity |
|---|---|---|---|---|---|---|
| Example 1 | 1.05 | Blocked | Penetrating | 39 | 1.4 | B |
| Example 2 | 1.0 | Blocked | Penetrating | 39 | 1.4 | B |
| Example 3 | 1.0 | Blocked | Blocked | 39 | 1.8 | C |
| Comparative Example 1 | 1.0 | Only plugs | Penetrating | 33 | 0.85 | A |

Figure 17:
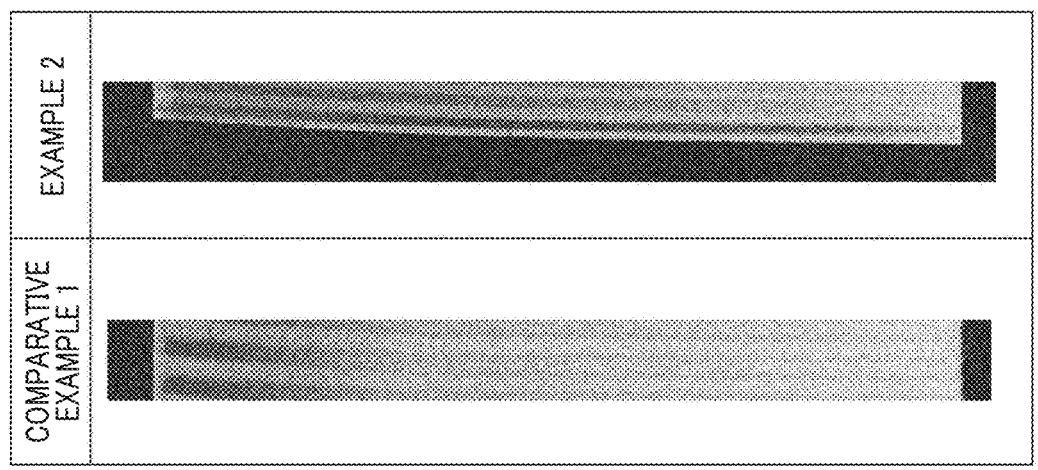
FIG. 17 is a substitute picture illustrating a comparison between a honeycomb structural body according to Example 2 and a honeycomb structural body according to Comparative Example 1 in terms of axial cross-sectional structure and the performance of collection of particulate matter.

FIG. 17 illustrates a comparison between the effects obtained in the presence and absence of blocked cells 3c. Particulate matter was collected almost throughout the honeycomb structural body 1 of Example 2, even on the downstream side of the gas flow paths 12. In the honeycomb structural body 1 of Comparative Example 1, however, the cell wall 2 did not contribute to the collection of particulate matter on the downstream side of the gas flow paths 12, showing that the performance of collection of particulate matter was significantly improved with the help of the blocked cells 3c.

Examples 4 to 10, Comparative Examples 2 and 3

Honeycomb structural bodies 1 (Examples 4 to 10) were manufactured in the above-mentioned manner based on the honeycomb structural body 1 of Example 1. Specifically, as described in Table 2, the cell cross-sectional ratio A/B of the honeycomb structural body 1 of Example 1 was changed, and some or all of the incomplete cells 3b were configured as blocked cells 3c. The honeycomb structural bodies 1 of Examples 4 to 6 had a cell cross-sectional ratio A/B of 1.1. In the honeycomb structural body 1 of Example 4, only the plugged incomplete cells 31b having a small cross-sectional area were configured as blocked cells 3c. In the honeycomb structural body 1 of Example 5, both the plugged incomplete cells 31b having a small cross-sectional area and the plugged incomplete cells 31b having a large cross-sectional area were configured as blocked cells 3c. In the honeycomb structural body 1 of Example 6, all the incomplete cells 3b were configured as blocked cells 3c. The honeycomb structural bodies 1 of Examples 7 to 9 had a cell cross-sectional ratio A/B of 5.0. In the honeycomb structural body 1 of Example 7, only the plugged incomplete cells 31b having a small cross-sectional area were configured as blocked cells 3c. In the honeycomb structural body 1 of Example 8, both the plugged incomplete cells 31b having a small cross-sectional area and the plugged incomplete cells 31b having a large cross-sectional area were configured as blocked cells 3c. In the honeycomb structural body 1 of Example 9, all the incomplete cells 3b were configured as blocked cells 3c.

Another honeycomb structural body 1 similar to the honeycomb structural body 1 of Example 5 was manufactured as Example 10. The cell cross-sectional area ratio A/B of the honeycomb structural body 1 of Example 10 was 5.2, which was the only difference between Examples 5 and 10. Furthermore, for the purpose of comparison, honeycomb structural bodies 1 without blocked cells 3c were manufactured as Comparative Examples 2 and 3 by leaving the plugged incomplete cells 31b unfilled. The other configurations of the honeycomb structural bodies 1 of Comparative Examples 2 and 3 were similar to those of Examples 4 and 7, respectively.

Each of the obtained honeycomb structural bodies 1 of Examples 4 to 10 and Comparative Examples 2 and 3 was evaluated in the same manner as the honeycomb structural body 1 of Example 1 in terms of the efficiency of collection of particulate matter, isostatic strength, and heat capacity. The increase in pressure loss due to the adoption of asymmetric cell structures was evaluated in the following manner. The pressure loss was evaluated on a three-point scale of A to C based on the ratio of the pressure loss at a higher cell cross-sectional area ratio A/B to the reference pressure loss (one) in the symmetric cell structure. The result is shown in Table 1.

A: ratios lower than 2.0
B: ratios equal to or higher than 2.0 and less than 3.08
C: ratios equal to or higher than 3.08

As described in Table 2, Comparative Example 2 without blocked cells 3c had an efficiency of collection of 39 mass % and an isostatic strength of 0.8 MPa, indicating that the adoption of the asymmetric cell structure was advantageous in the efficiency of collection but disadvantageous in isostatic strength. In contrast, Examples 4 and 5 having blocked cells 3c in some or all of the plugged incomplete cells 31b had efficiencies of collection ranging from 44 to 49 mass % and isostatic strengths ranging from 1.0 to 1.8 MPa, which were greater than those of Comparative Example 2. Comparative Example 3 having a much higher cell cross-sectional area ratio A/B had an efficiency of collection of 58 mass %, which was greater than those of Comparative Example 2 and Examples 4 and 5, but an isostatic strength of 0.7 MPa, which was even less than that of Comparative Example 2. In contrast, Examples 7 and 8 had efficiencies of collection ranging from 61 to 66 mass % and isostatic strengths ranging from 0.9 to 1.7 MPa, which were greater than those of Comparative Example 3.

This result indicates that adopting an asymmetric cell structure by making the cell cross-sectional area ratio A/B of the honeycomb structural body 1 equal to or higher than 1.1 improves the efficiency of collection effectively. However, Example 10 having a cell cross-sectional area ratio A/B of 5.2 was ranked as C in terms of pressure loss. Therefore, the cell cross-sectional area ratio A/B is preferably in the range of 1.1 to 5.0, which can improve both the efficiency of collection and strength while preventing an increase in pressure loss. Unless consideration of the influence on heat capacity is required, all the incomplete cells 3b can be blocked as in Examples 6 and 9, whereby the isostatic strength is further improved.

TABLE 2

| Example Comparative Example | A/B | Plugged incomplete cells small cross-sectional area | Plugged incomplete cells Large cross-sectional area | Penetrating cells (incomplete) | Efficiency of collection (%) | Strength (MPa) | Pressure loss | Heat capacity |
|---|---|---|---|---|---|---|---|---|
| Example 4 | 1.1 | Blocked | Only plugs | Penetrating | 44 | 1.0 | A | A |
| Example 5 | 1.1 | Blocked | Blocked | Penetrating | 49 | 1.4 | A | B |
| Example 6 | 1.1 | Blocked | Blocked | Blocked | 48 | 1.8 | A | C |
| Comparative Example 2 | 1.1 | Only plugs | Only plugs | Penetrating | 39 | 0.8 | A | A |
| Example 7 | 5.0 | Blocked | Only plugs | Penetrating | 61 | 0.9 | B | A |
| Example 8 | 5.0 | Blocked | Blocked | Penetrating | 66 | 1.3 | B | B |
| Example 9 | 5.0 | Blocked | Blocked | Blocked | 65 | 1.7 | B | C |
| Comparative Example 3 | 5.0 | Only plugs | Only plugs | Penetrating | 58 | 0.7 | B | A |
| Example 10 | 5.2 | Blocked | Blocked | Penetrating | 70 | 1.3 | C | B |

The present disclosure is not limited to the above embodiments, and can be applied to various embodiments without departing from the gist of the disclosure. For example, in each of the above embodiments, the honeycomb structural body 1 having a one-side plug structure is applied to the exhaust gas purification filter F for an automobile engine. However, in addition to automobile engines, applications of the honeycomb structural body 1 can include various internal combustion engines or other devices that require exhaust gas purification.

What is claimed is:

1. A honeycomb structural body comprising:
    a porous cell wall that partitions a cylindrical casing that is open at both ends;
    a large number of cells surrounded by the cell wall to form gas flow paths extending in an axial direction of the cylindrical casing; and
    plugs that alternately block the large number of cells at an upstream end face of the gas flow paths, wherein
    the large number of cells include plugged cells having the plugs and penetrating cells that do not have the plugs,
    the plugged cells and the penetrating cells both include complete cells totally surrounded by the cell wall and incomplete cells surrounded by the cylindrical casing and the cell wall and having an incomplete cross-sectional shape,
    at least some of plugged incomplete cells of the incomplete cells have a cross-sectional area A1 smaller than a cross-sectional area B of penetrating complete cells, and are configured as blocked cells that are entirely blocked inside in the axial direction, the plugged incomplete cells being some of the plugged cells, the penetrating complete cells being some of the penetrating cells and having a complete cell shape and
    on a downstream side of the gas flow paths, a rate of gas flow through the cell wall from the penetrating complete cells adjacent to the blocked cells is higher than that from the penetrating complete cells that are not adjacent to the blocked cells.

2. The honeycomb structural body according to claim 1, wherein
    all the plugged incomplete cells of the incomplete cells are configured as the blocked cells.

3. The honeycomb structural body according to claim 1, wherein
    at least some of penetrating incomplete cells of the incomplete cells are configured as the blocked cells, the penetrating incomplete cells being some of the penetrating cells.

4. The honeycomb structural body according to claim 1, wherein
    the penetrating cells of the large number of cells have a quadrangular cross-sectional shape, the plugged cells of the large number of cells have a polygonal cross-sectional shape having four or more vertices, and a relation between a cross-sectional area A of plugged complete cells and the cross-sectional area B satisfies A≥B, the plugged complete cells being some of the plugged cells and having a complete cell shape.

5. The honeycomb structural body according to claim 4, wherein
    a ratio AB of the cross-sectional area A to the cross-sectional area B is in a range of 1.1 to 5.

6. The honeycomb structural body according to claim 1, wherein
 a flow path length L of the gas flow paths is equal to or greater than 40 mm.

7. A method for manufacturing the honeycomb structural body according to claim 1, the method comprising:
 a molding step of using an extrusion die including an extrusion groove portion having a shape corresponding to the cell wall and the cylindrical casing, and supplying a molding material for the honeycomb structural body to the extrusion groove portion to extrude the molding material into a honeycomb structure;
 a plugging step of filling, to form the plugged cells, some of the cells with a formation material for the plugs on one end face side of an obtained honeycomb compact; and
 a blocking step of filling, to form the blocked cells, some of the incomplete cells with the formation material for the plugs entirely in the axial direction at the same time as the plugging step or after the plugging step.

8. A method for manufacturing the honeycomb structural body according to claim 1, the method comprising:
 a molding step of using an extrusion die including an extrusion groove portion having a shape corresponding to the cell wall and the cylindrical casing, and supplying a molding material for the honeycomb structural body to the extrusion groove portion to extrude the molding material into a honeycomb structure; and
 a plugging step of filling, to form the plugged cells, some of the cells with a formation material for the plugs on one end face side of an obtained honeycomb compact, wherein
 parts of the extrusion groove portion of the extrusion die are openings corresponding to the blocked cells, the openings extending between two end faces and having an incomplete cell shape.

9. An exhaust gas purification filter comprising:
 an exhaust gas pipe path for an internal combustion engine; and
 the honeycomb structural body according to claim 1 provided in the exhaust gas pipe path, wherein
 the honeycomb structural body is arranged in the exhaust gas pipe path such that the gas flow paths are aligned with the exhaust gas pipe path in the axial direction.

\* \* \* \* \*